Patented Jan. 30, 1934

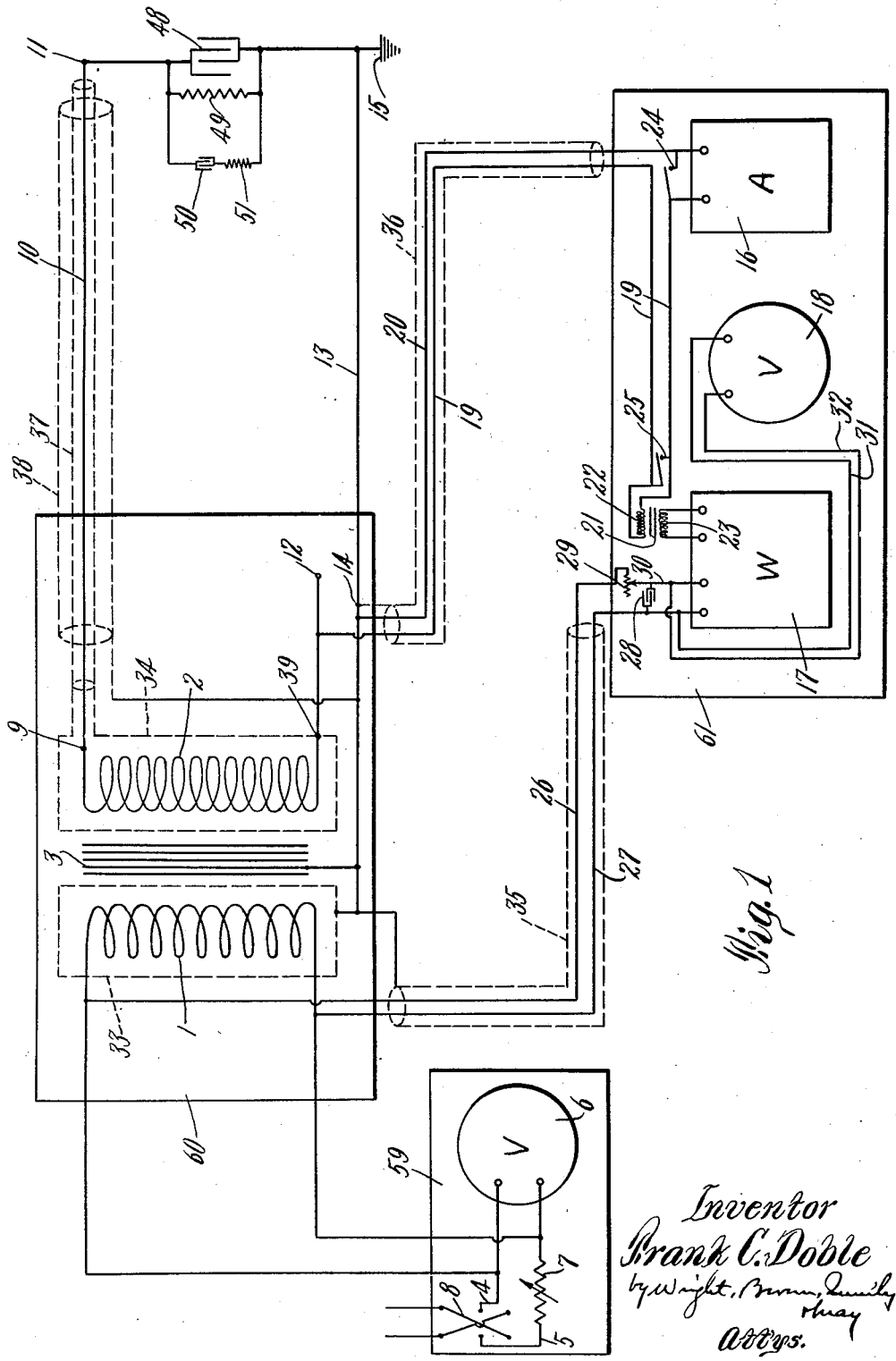

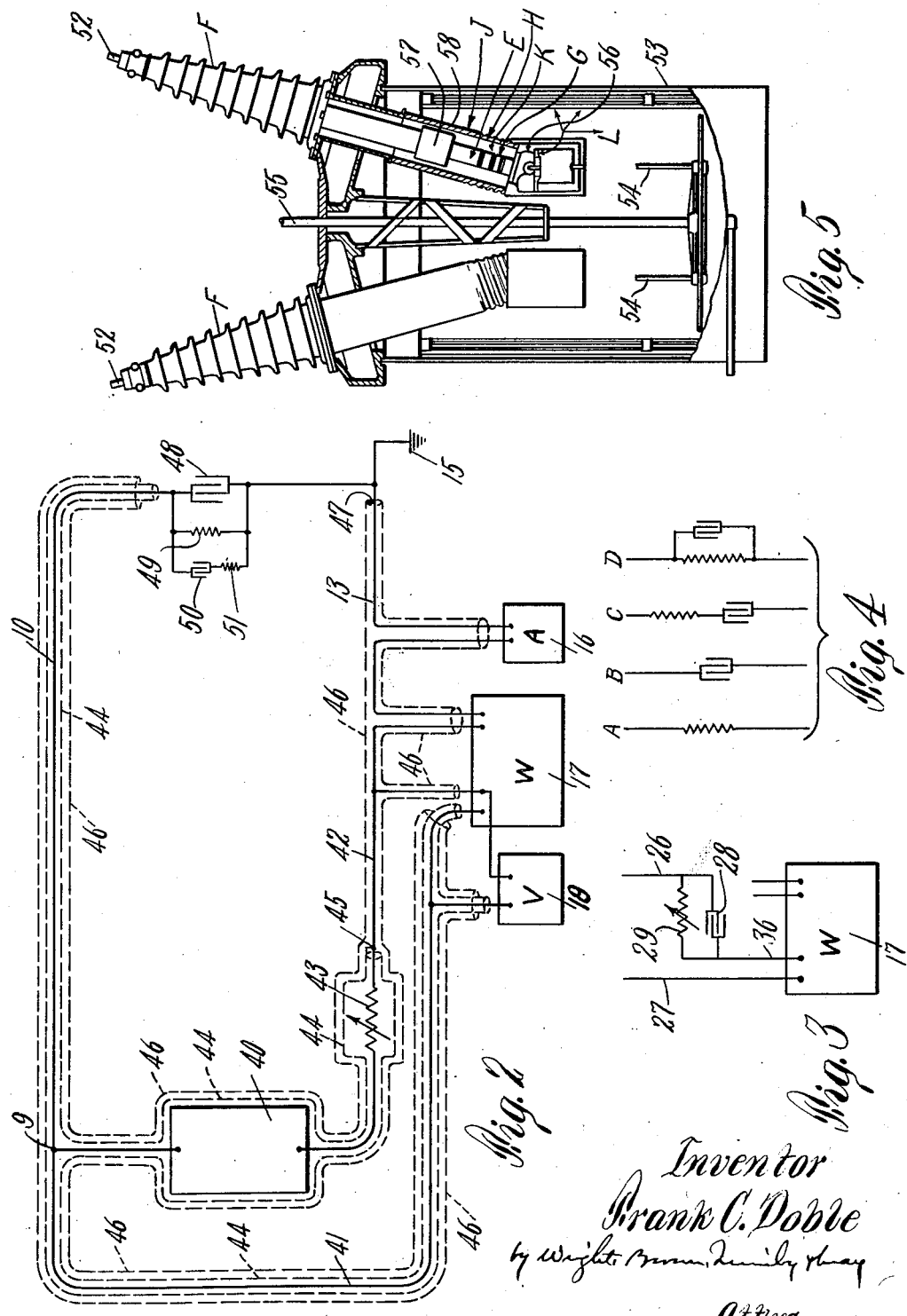

1,945,263

UNITED STATES PATENT OFFICE 1,945,263

APPARATUS FOR TESTING INSULATING VALUES

Frank C. Doble, Cambridge, Mass., assignor to Doble Engineering Company, Medford Hillside, Mass., a corporation of Massachusetts Application June 24, 1931. Serial No. 546,505

19 Claims. (Cl. 175—183)

This invention relates to apparatus for testing, and measuring quantitatively, the insulating value of dielectrics, particularly those which are fabricated into insulators of various forms for industrial use in confining the course of electric currents to their conducting paths. Its object is to provide an apparatus of this general character, but having particular characteristics which enable it to be brought into the field where the insulating material to be tested is installed, and enable it to be there used for examining such material, with dependable certainty and accuracy as to its measurements and the indications thereof.

There are many situations where it is desirable to test such insulating material in the field, and to do so rapidly, in order to limit to the minimum the time during which the equipment need be withdrawn from service for testing, and to avoid the expense and delay required for dismantling such equipment so that the insulation thereof may be tested in the laboratory. This is especially true with respect, for instance, to the insulating parts of oil circuit breakers, such as their bushings, operating rods, oil, supports, etc. While all such insulating parts and substances, and other insulating materials and articles as well, may be tested, and their insulating value accurately determined, in the laboratory, where ideal conditions may be obtained, the laboratory equipment heretofore known is not suitable for use in the field. The problem of testing insulating parts in their installed position is complicated by external electric stresses, stray currents, and the like, and the fact that frequently one electrode of the capacitor represented by the insulation under test is grounded; as in the case of oil circuit breakers, through which currents of high voltage pass, and the parts of which are mounted in and on a metal tank on the ground. A need, hitherto unsatisfied, exists for an apparatus capable of making such field tests and of correctly showing the condition of the insulation, free from errors due to these complicating factors.

My invention supplies this need by providing a portable apparatus which includes means for applying voltage to the insulation under test, and instruments for measuring the current passing through the insulation, and the watts loss therein, together with means for so protecting the measuring instruments from disturbing influences that their indications give a true and accurate measure of the condition of the test specimen. By virtue of its protection, it is effective for service in the field, even though surrounded by electrical influences of the most disturbing character, and where the insulation is grounded. And it may also be used in the laboratory.

The exact nature of the invention, and the principles and means in which it consists are disclosed in the following description, in connection with the drawings, to which attention is now directed.

In the drawings,—

Fig. 1 is a diagram illustrating the essential and optional elements of a complete apparatus containing the invention;

Fig. 2 is a diagram of the electrical connections of an alternative form of the apparatus;

Fig. 3 is a diagram illustrating a modification of a detail of the apparatus shown in Fig. 1;

Fig. 4 is an quivalent circuit diagram illustrating the electrical characteristics of the insulation such as is usually tested with the apparatus;

Fig. 5 is a sectional view of a standard oil circuit breaker showing paths in which power losses may take place.

Referring first to Fig. 1, the apparatus comprises a transformer having a primary winding 1, a secondary winding 2, and a core 3. The leads 4 and 5 to the primary coil derive current from any suitable source. Ordinarily, the standard commercial 110-volt alternating current is used, supplies of which are almost universally available. The transformer is designed to step up the voltage. I find it convenient to apply for the testing purposes of this invention a potential of approximately 10,000 volts and therefore use a commercial transformer with a step up ratio of approximately 120 to 1, when the apparatus is designed to be supplied with the standard 110-volt current. However, it involves no departure from the principles of the invention to increase the voltage in any other ratio provided a high enough potential is obtained in the terminals of the secondary coil for testing purposes.

A voltmeter 6 is connected between the direct power leads to the primary of the transformer, and a variable resistance 7 or any other means for varying the voltage, is inserted in one of these leads between the voltmeter and the source of power supply. This voltage varying means provides for an adjustment of the secondary voltage and enables that voltage to be set at a definite and fixed value when making all tests, thus simplifying the task of computing power and power factor from the readings obtained from the instruments of the apparatus. While the voltmeter 6 directly measures the voltage in the primary circuit, it is preferably calibrated in terms of the voltage developed in the secondary circuit, in order to determine the latter by direct reading and avoid the necessity of calculating it from the indications of the voltmeter and the ratio of transformation.

This transformer is necessary only when voltage sufficient for the particular test in view is otherwise unavailable.

A reversing switch 8 is preferably connected in the circuit between the variable resistance 7 and the source of power supply. The purpose of the switch is to reverse the polarity of the source, one side of which is generally grounded, in order to show whether any induction is present and enable a correction to be made if necessary. The presence of induction is shown if, after such reversal of polarity, the measuring instruments give different readings; and correction is made by taking the average of the two readings.

One terminal 9, hereinafter called the "line side", of the secondary winding 2 is connected to a conductor 10 which leads to one terminal 11 of the insulation to be tested and is of any length suitable and convenient for the purpose. The other terminal, hereinafter called the "guard side" of this winding, is connected to guard at 12.

A conductor 13 leads from the other side of the insulation under test to a terminal 14 of the apparatus hereinafter called the "ground terminal". Since one terminal of the insulation to be tested is usually permanently grounded, conductor 13 is usually connected to ground also, and is so connected for the testing of any grounded insulation, as indicated at 15, at the grounded terminal of the insulation. For instance, if the article tested is a bushing in an oil circuit breaker, then conductor 10 is connected with the conductor which passes through such bushing; and, the flange or external conductor of the bushing being grounded through the walls of the tank in which it is mounted, conductor 13 is connected between the ground terminal 14 and such tank. But if the insulation under test is of such a character, or installed in such a situation that neither of its terminals is permanently grounded, conductor 13 need not be grounded, except as a desirable measure of safety.

The indicating instruments of the apparatus consist of a current meter 16, a wattmeter 17 and preferably, but not essentially for ordinary measurements, a voltmeter 18. The current meter is connected by a conductor 19 with the guard side of the secondary coil 2, and by a conductor 20 with ground terminal 14. The current side of the wattmeter 17 is in effect connected in series with the current meter, and may be directly so connected. But, if desired, the connection may be made, as shown in Fig. 1, through a transformer 21 of which the primary coil 22 is interposed in the conductor 19 and the secondary coil 23 is directly connected with the current side of the wattmeter. The reason for using a transformer at this point is that the low conductivity of the insulation being tested reduces the current intensity in the secondary circuit to a value which may be too small for a sufficient effect in the wattmeter, and the transformer 19 is of a character which steps up this current. However, by providing a wattmeter of extraordinary sensitiveness, it is possible to dispense with this transformer. In actual operation the current meter and wattmeter may be, and preferably are, each put in circuit one at a time, the other instrument being simultaneously short-circuited. Cut-out switches for these instruments are indicated at 24 and 25.

As a matter of convenience, the potential coil of the wattmeter is connected across the primary of the main transformer by conductors 26 and 27; however, any other method of delivering to the wattmeter a suitable potential which has a known relation to the test voltage would suffice. This might be a separate potential transformer or a special winding in the same transformer or a tap from the secondary winding 2 with, if necessary, a direct reduction of the high voltage by means of an impedance in series with the wattmeter coil. The wattmeter, provided it is properly phased, will then indicate the watts loss in the insulation being tested.

A compensating device is interposed in the connections to the potential side of the wattmeter in order to bring the general relationship of the values which are read on the instruments to a standard, predetermined condition by making certain phase shifts in the electrical connections. It comprises a condenser 28 and a variable resistance 29. One embodiment of this compensating device, shown in Fig. 1, has the condenser 28 connected between the leads 27 and 30, and the variable resistance 29 connected between the leads 26 and 30. An alternate arrangement indicated by Fig. 3 shows the condenser 28, as well as the variable resistance, connected between conductors 26 and 30. These are illustrative, but not the only possible means for effecting the desired end. The only use made of this device is to calibrate or adjust the apparatus, with reference to a known impedance having a capacitative reactance, preparatory to a test. The voltage impressed on the potential coil of the wattmeter is indicated directly by the voltmeter 18, which is in parallel circuit with the potential coil of the wattmeter by means of the conductors 31 and 32. This voltmeter provides the means for giving refined accuracy when desired.

The coils of the transformer and the conductors therefrom to the measuring instruments and to the thing being tested are all protected by shields from the influence of stray currents and other electrical stresses which otherwise might affect the instruments and vitiate the results. Such shields are envelopes of conducting material which surround the transformer coils and the conducting leads or cables, while being insulated therefrom, and are connected to either guard or ground. In structure they may be made as tubes constructed in whole or in part of braided fine metallic wires, or as sheets of wire fabric wrapped about the shielded parts, or otherwise in any manner now known to the art or which may in future be found suitable. The shields for the primary and secondary coils of the transformer are shown by the broken line envelopes 33 and 34 separately surrounding these coils. That for the cable leading to the potential coil of the wattmeter is similarly indicated as a sleeve 35; that for the cable leading to the current meter as a sleeve 36, and that for the line side conductor 10 as a sleeve 37. The latter is in turn shielded by an outer sleeve 38 of similar characteristics. It will be self-evident to those skilled in the art that this description of shields necessarily implies the presence of suitable insulation between the shields and the conductors which they respectively envelope. The shields 33, 35, 36 and 38, as well as the core 3 of the transformer, are all shown as connected to ground terminal 14, the connections of which are all plainly indicated. The shield 37 is connected with shield 34, and the latter is connected at 39 with the guard terminal of the secondary coil, such connection being therefore at a point between the measuring instruments and the low tension side of the voltage source (the secondary winding 2). Variations from the specific arrangement thus shown and described are permissible within the scope of the invention, however, the essential thing being that suitable electrical shields are provided for such circuits and parts thereof as require shielding from disturbing influences in order to enable results of the desired accuracy to be obtained.

One of the important basic features of the invention is embodied in the shield or shields 34 and 37 which enclose the secondary coil of the transformer and the high tension lead to the thing being tested, and are at a higher potential than the ground potential. This shielding factor eliminates the influence of the high tension winding and connecting cable from the measuring instruments, and confines the currents to their prescribed paths in the apparatus. In the ordinary use of a high voltage transformer with a line running out from it, there are charging currents between the transformer windings and the ground, and also between the high voltage conductor and the ground. These charging currents may be, and usually are, accompanied by certain losses. The shielding here referred to makes of the transformer and the high voltage conductor, together with the shields, an isolated system so constituted that the charging currents and losses occurring therein do not enter in any way into the external circuit. The external circuit includes the insulation under test, and in consequence of this arrangement, the indication of the meters connected thereto does not include the charging current and losses above mentioned. The readings on the meters may thereby be made to represent only losses in the insulation under test which it is desired to study.

The shielding which is connected to ground (e. g., through the connection at 14) is a second system of shielding. It has two functions; first to give a constant capacitance in parallel with the measuring instruments; and, second, to cut off external electro-static disturbances either from any parts of the apparatus itself or from external high voltage sources. Its effect of giving a substantially constant capacitance between the guard and ground is a valuable asset where the highest accuracy is required. In practice some variation is noticed in the capacitance between the two shields under different temperature conditions, and the amount of this variation depends on the materials used as dielectric between the two shields. As the capacitance is across the current circuit of the watt meter and ammeter, a change in its impedance may change the phase of the current passing through the watt meter, which may be compensated for by a shift in the phase of the current passing through the potential circuit of the watt meter, effected by the capacitance 28 and resistance 29 previously described. Other means or methods for effecting equivalent compensation are within the scope of novelty of this invention and of the protection which I claim, wherefore it is to be understood that the compensating device last referred to is illustrative and not limiting of that phase of the invention. Of the external shielding, viz., the shielding which is connected to ground, the most important part is the shield element 38 which surrounds the inner shield 37 of the high tension conductor 10. The parts or elements 35 and 36 which shield the cables leading to and from the measuring instruments may or may not be necessary. They are necessary only if the instruments are located more than about three or four feet away from the voltage source; but since in practice the instruments are almost always located farther away from the transformer than this short distance, such shielding parts 35 and 36 are a practically necessary part of the apparatus.

Mention has previously been made of the fact that the transformer 21 may be omitted in certain circumstances. It is also the fact that the main transformer 1, 2, 3 may be omitted when a source of voltage suitable for the test in view without conversion is available. An apparatus embodying the invention, simplified by the omission of these elements, is shown in Fig. 2. Here 40 represents a voltage source of any character adapted to deliver alternating current. The line side terminal of this voltage source is indicated by the numeral 9, as in Fig. 1, and the conductor leading to the insulation to be tested is designated 10. The measuring instruments are also designated by the same characters as in Fig. 1. A conductor 41 leads from the line side of the source to connection in parallel with the voltmeter and the potential coil of the wattmeter, both of which are also connected with the return conductor 42. The current meter and the current side of the wattmeter are connected in series with the conductor which leads from the grounded side of the insulation. A variable resistance 43 between the voltage source and the grounded conductor serves the purpose of variable resistance 29.

Shields for the voltage source, the conductors 10, 41, 42 and the variable resistance 43 are all comprehensively designated by the numeral 44, and are connected to a guard terminal 45. These shields, and also the ground conductor and the connections between the latter, and the current meter and wattmeter are shielded by further shields, all comprehensively designated as 46, which are connected to ground at 47. Such shields are, in purpose and functions, essentially like those previously described.

In connection with the topic of shields, it may be observed that, wherever two or more insulated conductors are contained in the same cable, in any part of the apparatus, each separate conductor may be separately surrounded by a shield to protect it from the effect of the adjacent conductor or conductors.

The thing being tested is indicated conventionally in Figs. 1 and 2 as a condenser 48 and a resistance 49 around the condenser, and a condenser 50 in series with a resistance 51, all connected between the line side conductor and ground, as indicated, to show an inclusive complex circuit. Thus is indicated the principle on which the apparatus operates, for every insulator or dielectric is, or may be made in effect, a circuit comprising one or more condensers and one or more resistances. The complex circuit, as shown in Fig. 1 connected between the line conductor and the ground, covers nearly all the conditions which are normally found in practice. Under some conditions the circuit might be less complex and could be indicated by a simpler arrangement as shown in Fig. 4, by A, B, C, D. (A—a resistance alone; B—a capacity alone; C—a resistance in series with a capacity; D—a resistance in parallel with a capacity.) The watts loss due to imperfection in the insulator is the cause of the indications given by the wattmeter in the course of the test. If the insulation gives rise to a loss of any kind in its substance, or if there is a leakage path over its surface, the current flow and the watts loss resulting therefrom are indicated by the instruments.

For further illustration of the nature of the insulation which may be tested by this apparatus, and of the nature of the paths in which losses of current and power may occur, I have shown in Fig. 5 a standard type of oil circuit breaker with indications thereon of possible leakage paths. 52 represents the terminals for connection to the power line, 53 the tank, and 54 the ends of the switch bridge which are movable by means of the rod 55 into and out of contact with the inner terminals 56 of the conductors 52.

E represents the leakage path through the main insulation which surrounds the line conductor;

F represents the leakage path over the exposed surface of the bushing which is usually porcelain;

G represents the leakage path over the surface of the lower part of the insulating bushing between the inner terminal 56 and ground at the protecting shield 57;

H is the leakage path over the inside of the porcelain arc shield 58 between the terminal 56 and the metal of the tank;

J is the leakage path over the external surface of the arc shield between the terminal 56 and the metal of the tank;

K is the leakage path through the oil inside the arc shield between terminal 56 and ground;

L is the leakage path anywhere through the oil in the main tank between terminal 56 and the metal of the tank.

All of these leakage paths are in parallel between the live conductor 52, 56 and the tank, and power losses may occur through any of them.

An electrical measurement indicating the quality or condition of the insulation under test depends upon the current and watts loss at a given applied voltage. A combination of these factors is known as "power factor" which may be employed as a useful indication of the condition of insulation.

By definition, power factor equals watts loss divided by product of volts applied and current in amperes; for example:

$$PF = \frac{W}{VI}$$

PF—Power factor
W—Watts loss.
I—Amperes
V—Volts applied

In practical use the test apparatus described herein is preferably tested and adjusted with reference to a known impedance having a capacitive reactance.

A particularly valuable feature of this apparatus is its portability. All of its parts may be contained in a single box or case, but preferably, for greater convenience of transportation, they are collected in separate cases; i. e., the variable resistance 7, the reversing switch 8, and the voltmeter 6 and its connections in one case 59, the transformer in a second case 60, and the wattmeter and current meter, with the voltmeter 18 when used, in a third case 61. These units may be readily carried to the place where the insulation etc. to be tested are installed, and where they are connected to complete the circuits shown in the diagram. The measuring instruments, rheostats and transformers used in this equipment are, or may be, standard instruments or they may be specially designed to secure extraordinary sensitiveness or to permit adjustments of more than usual delicacy and accuracy. Thus, for instance, I prefer to use as the wattmeter 17 an instrument of greater sensitivity than those commonly used for measuring extremely small losses.

What I claim and desire to secure by Letters Patent is:

1. An apparatus for measuring the electrical qualities of insulating materials comprising a high voltage step up transformer, means for varying the low tension voltage applied to the transformer, a conductor leading from the high tension winding to the insulation to be measured, an inner system of shields insulated from ground and covering the high tension winding and said leading conductor, said shielding system being connected to the opposite end of the high tension winding of said conductor, a watt meter, an ammeter, said ammeter and the current coil of said watt meter being connected between the inner shield system and ground, a volt meter which together with the potential coil of the watt meter is connected across the low tension side of the transformer, and an outer system of shields connected to ground and covering the low tension transformer winding and all of the said leads and connections.

2. An apparatus as set forth in claim 1 and comprising further means for compensating the watt meter for variations in the capacitance between the inner and outer shield systems.

3. An apparatus for measuring the electrical qualities of insulation between conductive electrodes when one electrode is grounded and the other is non-grounded, comprising in combination with a source of alternating voltage, a connection between said voltage source and the non-grounded electrode, a current meter and the current side of a wattmeter each connected between the grounded electrode and the voltage source, the potential side of said wattmeter being connected to receive voltage at a known proportion to the voltage of said voltage source, and a shield system covering said voltage source and connection, insulated from ground and connected in circuit with the voltage source at a point between the latter and said meters.

4. An apparatus for measuring the electrical qualities of an insulation between conductive electrodes when one electrode is grounded and the other is nongrounded, comprising in combination with a source of alternating voltage, a connection between the high tension side of said source and said non-grounded electrode, a current meter connected between said grounded electrode and the low tension side of the voltage source, a wattmeter of which the current side is likewise so connected between said grounded electrode and source and the potential side is connected to receive voltage at a known proportion to the voltage of said source, an inner shield system covering said voltage source and high tension connection, insulated from ground and connected to the low tension side of the voltage source at a point between the latter and said instruments, and a grounded outer shield surrounding the inner shield of said high tension connection and insulated from the latter.

5. In an apparatus for measuring the electrical qualities of insulation, a source of alternating voltage, a conductor leading to the unshielded insulation under test from the high tension side of said voltage source, a wattmeter having its current side connected between such insulation and the low tension side of the voltage source, and its potential side connected to receive voltage at a potential having a known ratio to that of said voltage source, a current meter in series between the insulation being tested and the low tension side of the voltage source, a shielding system for the voltage source and said conductor, connected to by-pass losses and charging currents in said conductor so that such losses and currents will not pass through the instruments, and an outer shielding system for the said conductor.

6. An apparatus for the measurement of electrical qualities of insulation in the field between conductive electrodes when one of said electrodes is grounded and the other is non-grounded comprising a voltage step up transformer, a conductor from the high voltage winding of such transformer adapted to be led to said non grounded electrode, instruments for measuring amperes and watts loss in said insulation connected between said grounded electrode and the low tension side of said high voltage winding, an inner shield for said high tension winding and conductor connected to said high voltage winding between the low tension side thereof and said instruments so as to conduct losses and charging currents of the conductor in a path outside of the instruments, and an outer shield for said conductor connected to ground.

7. In an apparatus as and for the purpose set forth, a double shielded high tension conductor adapted to connect an unshielded test specimen in the field with an alternating voltage source, and a measuring instrument connected to indicate the effect of current through the insulation, the inner shield of said conductor being connected to the voltage source in such a manner as to eliminate effect on the instrument of charging currents and losses in the conductor, and the outer shield being grounded so as to eliminate the effect of induced voltages in high electrostatic fields from passing through the instrument.

8. An apparatus, including a source of alternating voltage, for testing the electrical qualities of an unshielded grounded insulation, comprising a cable adapted to be led from the high tension side of the voltage source to the terminal or electrode of the insulation under test opposite to the grounded side or electrode thereof, an inner electrostatic shield enveloping said cable connected to eliminate the effect of charging currents and losses in the conductor from the indicating parts of the apparatus, and an outer, grounded electrostatic shield enveloping said inner shield.

9. In an apparatus for the purpose set forth, the combination of a voltage step up transformer, a conductor leading from the high tension winding of said transformer to the insulation under test, a wattmeter, an ammeter, the current side of the wattmeter and the ammeter being connected in circuit with said high tension winding and adapted to be connected in circuit with the insulation under test, and the potential side of the wattmeter being connected to receive voltage at a known proportion to the voltage of said high tension winding, a shield for said winding and conductor connected to the guard side of the winding between the latter and said instruments, an outer shield for the conductor connected to ground, and a compensating device connected in the potential circuit of the wattmeter adjustable to bring the current therein essentially into phase with the voltage in the high voltage winding of the transformer.

10. An apparatus for measuring electrical qualities of insulation comprising a source of alternating voltage, a conductor leading from the high tension side of said source for connection with the insulation under test, a wattmeter having its current coil connected in circuit with the voltage source and adapted to be connected in circuit with the test insulation, the potential coil of said wattmeter being connected to receive voltage at a known proportion to the voltage of said source, a shield for said voltage source and conductor connected to the source between the low tension side thereof and the wattmeter, a grounded outer shield for said conductor, and means for effecting a compensation of the wattmeter to bring the currents in the current and potential coils thereof substantially into phase with one another.

11. An apparatus for measuring in the field electrical qualities of insulation between a grounded structure and a high tension terminal, comprising an alternating voltage source, a lead to said high tension terminal from the voltage source, means in circuit with said grounded structure and the voltage source for measuring energy loss and current, and means for so shielding said lead as to divert its charging current away from said measuring means.

12. An apparatus for measuring in the field electrical qualities of insulation between a grounded structure and a high tension terminal, comprising an alternating voltage source, a lead to said high tension terminal from the voltage source, means in circuit with said grounded structure and the voltage source for measuring energy loss and current, means for so shielding said lead as to divert its charging current away from said measuring means, and means for shielding said lead from external electric influence.

13. An apparatus for measuring in the field electrical qualities of insulation between a grounded structure and a high tension terminal, comprising a source of alternating voltage adapted to be connected in circuit with said high tension terminal and said grounded structure, measuring means interposed in circuit between the voltage source and one side of the insulation for taking measurements determinative of energy loss and current in the insulation, and shielding means for the apparatus organized to maintain a substantially constant capacitance in parallel with said measuring means.

14. An apparatus for measuring in the field electrical qualities of insulation between a grounded structure and a high tension terminal, comprising a source of alternating voltage adapted to be connected in circuit with said high tension terminal and said grounded structure, measuring means interposed in circuit between the voltage source and one side of the insulation for taking measurements determinative of energy loss and current in the insulation, and a system of inner and outer shields for said apparatus connected respectively to guard and ground so as to maintain a substantially constant capacitance.

15. An apparatus for measuring in the field electrical qualities of insulation interposed between a grounded structure and a high tension terminal, comprising a source of alternating voltage adapted to be connected in circuit with said high tension terminal and said grounded structure, measuring means interposed in circuit between said voltage source and one side of the insulation for taking measurements determinative of energy loss and current, and means for shielding said voltage source and its connection with said high tension terminal so as to divert their charging currents away from the measuring means.

16. An apparatus for measuring the qualities of insulation in an oil circuit breaker between the grounded structure or electrode of such circuit breaker and the high tension side thereof, in the field, comprising an alternating voltage source, a shielded lead from said source to the high tension side of said insulation, and means for measuring the loss and charging current or capacitance of said insulation.

17. An apparatus for measuring the qualities of insulation in an oil circuit breaker between the grounded structure or electrode of such circuit breaker and the high tension side thereof, in the field, comprising an alternating voltage source, a double-shielded lead from said source to the high tension side of said insulation, and means for measuring the loss and charging current or capacitance of said insulation; one of the shields of said lead being a means to divert the charging currents of the lead away from said measuring means, and the other being a means to cut off external electrostatic disturbances.

18. An apparatus for measuring the qualities of insulation in an oil circuit breaker between the grounded structure or electrode of such circuit breaker and the high tension side thereof, in the field, comprising a source of alternating voltage, means for reversing at will the phase of such voltage source, a shielded lead from said source to the high tension side of said insulation, and means for measuring the loss and charging current or capacitance of said insulation.

19. An apparatus for measuring in the field electrical qualities of insulation between a grounded structure and a high tension terminal comprising an alternating voltage source, a double shielded lead from said source to the high tension terminal, means for measuring the energy loss and current or capacitance of said insulation, and means for reversing the phase of said voltage source as a correction for induction when present.

FRANK C. DOBLE.